(12) United States Patent
Barbeau

(10) Patent No.: US 7,424,310 B1
(45) Date of Patent: Sep. 9, 2008

(54) SYSTEM, METHOD, AND APPARATUS FOR AUTOMATIC TRANSMISSION OF RECENTLY CAPTURED IMAGES

(75) Inventor: Pierre Barbeau, Leawood, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 125 days.

(21) Appl. No.: 10/945,410

(22) Filed: Sep. 20, 2004

Related U.S. Application Data

(60) Provisional application No. 60/604,794, filed on Aug. 26, 2004.

(51) Int. Cl.
*H04M 1/00* (2006.01)
(52) U.S. Cl. ............... 455/556.1; 455/404.1; 365/15
(58) Field of Classification Search ............. 455/556.1, 455/404.1; 365/15
See application file for complete search history.

(56) References Cited

U.S. PATENT DOCUMENTS

| | | | | |
|---|---|---|---|---|
| 5,327,144 A | 7/1994 | Stilp et al. | ........... | 342/387 |
| 5,386,117 A | 1/1995 | Piety et al. | ........... | 250/330 |
| 5,402,171 A | 3/1995 | Tagami et al. | ........... | 348/219.1 |
| H001717 H | 4/1998 | Stoudt et al. | | |
| 5,748,484 A | 5/1998 | Cannon et al. | ........... | 364/479.03 |
| 5,806,005 A | 9/1998 | Hull et al. | ........... | 455/566 |
| 5,943,603 A | 8/1999 | Parulski et al. | ........... | 725/133 |
| 6,011,967 A * | 1/2000 | Wieck | ........... | 455/404.1 |
| 6,278,884 B1 * | 8/2001 | Kim, II | ........... | 455/556.1 |
| 6,282,362 B1 | 8/2001 | Murphy et al. | ........... | 386/46 |
| 6,317,609 B1 | 11/2001 | Alperovich et al. | | |
| 6,344,853 B1 | 2/2002 | Knight | ........... | 345/629 |
| 6,359,837 B1 | 3/2002 | Tsukamoto | ........... | 368/10 |
| 6,396,537 B1 | 5/2002 | Squilla et al. | ........... | 348/239 |
| 6,449,485 B1 | 9/2002 | Anzil | ........... | 455/456.1 |
| 6,472,982 B2 * | 10/2002 | Eida et al. | ........... | 340/539.1 |
| 6,507,362 B1 | 1/2003 | Akerib | ........... | 725/109 |
| 6,573,927 B2 | 6/2003 | Parulski et al. | ........... | 348/32 |
| 6,636,259 B1 | 10/2003 | Anderson et al. | ........... | 348/211.3 |
| 6,657,661 B1 | 12/2003 | Cazier | ........... | 348/231.2 |
| 6,741,864 B2 | 5/2004 | Wilcock et al. | ........... | 455/456.1 |
| 6,833,861 B2 | 12/2004 | Matsumoto et al. | ........... | 348/207.2 |
| 6,853,461 B1 | 2/2005 | Shiimori | ........... | 358/1.15 |
| 6,862,045 B2 | 3/2005 | Morimoto et al. | ........... | 348/515 |
| 6,911,992 B2 | 6/2005 | Bronstein et al. | ........... | 345/629 |

(Continued)

FOREIGN PATENT DOCUMENTS

| DE | 199 13 019 A 1 | 2/2001 |
|---|---|---|
| WO | WO 00/75859 | 12/2000 |
| WO | WO 01/86511 A2 | 11/2001 |

OTHER PUBLICATIONS

Xeni Jardin, "Phonecam Nation." (Document recites it was posted on Jun. 10, 2003. Document was printed from the World Wide Web.).

(Continued)

*Primary Examiner*—Vincent P. Harper
*Assistant Examiner*—Jaime M Holliday

(57) ABSTRACT

A system, method and apparatus for delivering a photo captured during a predefined time-interval prior to a voice call. A camera phone or other telephone device will detect that an image is captured during the predefined time-interval prior to the device engaging in a voice call with a given party. In response, the device will automatically send the image to the given party.

28 Claims, 6 Drawing Sheets

U.S. PATENT DOCUMENTS

| | | | |
|---|---|---|---|
| 6,912,398 | B1 | 6/2005 | Domnitz .................... 455/461 |
| 6,914,626 | B2 | 7/2005 | Squibbs .................. 348/231.3 |
| 6,941,276 | B2 | 9/2005 | Haeberli ...................... 705/26 |
| 7,092,735 | B2 | 8/2006 | Osann, Jr. |
| 2002/0054224 | A1 | 5/2002 | Wasula et al. ............... 348/232 |
| 2002/0137528 | A1 | 9/2002 | Fraccaroli ................... 455/457 |
| 2003/0007616 | A1 | 1/2003 | Alves et al. |
| 2003/0058353 | A1* | 3/2003 | Tsue ....................... 348/231.2 |
| 2003/0137422 | A1 | 7/2003 | Nishibori ................. 340/573.1 |
| 2003/0202101 | A1 | 10/2003 | Monroe et al. ............. 348/156 |
| 2003/0206316 | A1 | 11/2003 | Anderson et al. .......... 358/1.18 |
| 2004/0005915 | A1* | 1/2004 | Hunter .................... 455/575.1 |
| 2004/0015191 | A1 | 1/2004 | Otman et al. .................. 607/5 |
| 2004/0152451 | A1* | 8/2004 | Park ........................ 455/412.1 |
| 2004/0185900 | A1 | 9/2004 | McElveen |
| 2004/0204202 | A1 | 10/2004 | Shimamura et al. |
| 2004/0240434 | A1 | 12/2004 | Sato et al. |
| 2005/0105705 | A1 | 5/2005 | Elcock et al. |
| 2005/0250534 | A1 | 11/2005 | Maurer |
| 2005/0287997 | A1 | 12/2005 | Fournier |
| 2006/0033809 | A1 | 2/2006 | Farley |
| 2006/0050536 | A1* | 3/2006 | Kim et al. ...................... 363/15 |
| 2006/0222151 | A1* | 10/2006 | Goldman et al. .............. 379/45 |

OTHER PUBLICATIONS

TheKansasCityChannel.com, "Teen Uses Camera Phone to Thwart Apparent Abduction." (Document recites it was posted on Aug. 1, 2003. Document was prined from the World Wide Web.).

"Camera Phone Hang-up." (Document was posted on the World Wide Web at least as early as Dec. 23, 2003. Document was printed from the World Wide Web.).

"What to do when you're in an Accident." (Document was posted on the World Wide Web at least as early as Feb. 18, 2004. Document was printed from the World Wide Web.).

Audio Device, Covert Tracking System, http://www.spyshopusa.com/Tracking_S.htm, printed from the World Wide Web on Apr. 1, 2002.

Technical Metadata for Digital Still Images—National Information Standards Organization (NISO), http://www.niso.org/committees/committee_au.html, printed from the World Wide Web on Apr. 25, 2002.

Portelligent, Epson Location Organizer with Camera & GPS Performance and Design Analysis, Report #140-991020-1b, 2000.

Harvard University Library: Digital Repository Service (DRS), "DRS Documentation—Administrative Metadata for Digital Still Images," v.1.2, Feb. 20, 2002.

Cat-Photo Standard 2.0 Tags, Cat-Photo Information, http://www.cat-photo.sourceforge.net/standard/tags.html, printed from the World Wide Web on Apr. 23, 2002.

Trimble Navigation Ltd.—GPS Software—ODELCO, Media Mapper, http://www.odelco.com/TRIMBLE/mmapper.htm, printed from the World Wide Web on Apr. 1, 2002.

"Datum Unveils Breakthrough Timing Technology for Telecommunications, Enterprise and OEM Applications," Press Release dated Feb. 8, 1999.

EOM Archives, http://www.eomonline.com/Common/Archives/November%2098/g2.htm, printed from the World Wide Web on Apr. 2, 2002.

EndRun Technologies, CDMA Timing Technology: No Antenna Hassle, http://www.endruntechnologies.com/cdma.htm, printed from the World Wide Web on Feb. 19, 2002, reprinted in full on Mar. 6, 2003.

EndRun Technologies, "Praecis Ce—OEM Time & Frequency Engine," printed on Apr. 4, 2002.

It's a camera, a PDA, a phone! It's Origami!, http://www.nwfusion.com/columnists/2001/1126cooltools.html, printed from the World Wide Web on Apr. 1, 2002.

IBM, "IBM 340 MB Microdrive—Transforming Storage Technology," 1998.

Digital Imaging Group, Inc., "DIG35 Specification—Metadata for Digital Images," Version 1, Aug. 30, 2000.

Digital Imaging Group, Inc. "DIG35 Specification—Metadata for Digital Images," Version 1.1 Working Draft, Apr. 16, 2001.

I3A-DIG35, "Metadata Standards a Smarter Way to Look at Digital Images," http://www.i3a.org/I_dig35.html, printed from the World Wide Web on Apr. 29, 2002.

Overview, GPS Photo Link, http://www.geospatialexperts.com/gpl/help/overview.html , printed from the World Wide Web on Apr. 29, 2002.

Image Archive, http://ocean.ucc.ie/00/hanrahag/minipro/html, printed from the World Wide Web on Apr. 29, 2002.

Microsoft Windows Platform Development, "MetaData in Image Files and GDI+," http://www.microsoft.com/hwdev/tech/display/GDIplus_Metadata.asp, printed from the World Wide Web on Apr. 29, 2002.

NISO Draft Standard, "Data Dictionary—Technical Metadata for Digital Still Images," Working draft, 1.0, Jul. 5, 2000.

Praecis Ce, OEM Time & Frequency Engine, EndRun Technologies, Nov. 14, 2000, pp. 1-2.

Symmetricom—Symmetricom's breakthrough clock technology uses CDMA signals for timing the network edge, http://www.symmetricom.com/news/020899.html, printed from the World Wide Web on Aug. 8, 2002.

JC Labs, Inc.—HSC-500 x2 Camera, http://www.jclabs.com/hsc-500.html, printed from the World Wide Web on Feb. 25, 2002.

Meteor-II/MC, http://www.fabrimex.ch/meteor-i1.htm, printed from the World Wide Web on Feb. 25, 2002.

EndRun Technologies—Products—CDMA Technology, http:www.endruntechnologies.com/cdma.htm, printed from the World Wide Web on Aug. 8, 2002.

EndRun Technologies; Benefits of GPS vs. CDMA, http://www.endruntechnologies.com/gps-cdma.htm, printed from the World Wide Web on Jan. 18, 2002.

Point Grey Research, Dragonfly, IEEE-1394 Digital Camera, printed from the World Wide Web on Sep. 5, 2002.

* cited by examiner

SYSTEM, METHOD, AND APPARATUS FOR AUTOMATIC TRANSMISSION OF RECENTLY CAPTURED IMAGES

BACKGROUND

1. Field of Invention

The present invention relates to digital images and, more particularly, to the transmission of digital images.

2. Description of Related Art

It is generally known today to be able to capture digital images and transmit the images over networks from one location to another. Generally speaking, an image-capturing mechanism will function to capture the digital image, and a network interface will function to transmit the image onto a network for receipt by a destination entity. The image-capturing mechanism and network interface can be situated in separate devices. For instance, an image-capturing mechanism situated in a digital camera, and a network interface situated in a personal computer to which the camera is connected by a cable connection. Alternatively, the image-capturing mechanism and network interface can be integrated (permanently or temporarily) into a unitary device, such as a camera phone or other network-capable (e.g., wirelessly equipped) digital camera.

An exemplary image-capturing mechanism comprises an image sensor, which is a semiconductor device that detects light indicative of an image and provides an electronic representation of the image to be stored as an array of pixels. And an exemplary network interface comprises a network interface card or other module, which can provide for wireless and/or wired network communication.

By way of example, a camera phone typically includes both digital camera function and cellular wireless communication function. In most cases, the cellular wireless communication function provides for wireless packet data communication (e.g., 3 G communication), so that the camera phone can engage in IP communication with network servers and other entities via a cellular carrier's radio access network. More particularly, the camera phone establishes a radio link with the RAN and a data link (e.g., point to point protocol (PPP) link) with a gateway such as a packet data serving node (PDSN). Through those links, the camera phone sends and receives packet data over a packet-switched network such as the carrier's core packet network and/or the Internet.

As another example, a personal computer or other Internet Protocol (IP) telephone having an IP connection receives an image captured by a digital camera, optical scanner or other device, and then similarly transmits the image onto a packet-switched network for receipt by a destination entity.

In an arrangement commonly employed with camera phones, a digital image is transmitted together with a destination-identifier to a designated network server on the packet-switched network. A destination-identifier indicates to the network server where the image is to be sent. Exemplary destination-identifiers comprise an e-mail address or telephone number of a given party. Upon receipt of the image and destination-identifier, the network server may then use the destination-identifier as a basis to forward the image along to the given party. An exemplary given party comprises a remote camera phone, a personal computer coupled with a telephone, another network server, a user, or some other entity.

Upon receipt of a digital image transmitted in this or some other manner, a user may then perform various functions with respect to the image. For instance, the user may view the image, forward the image to others, print the image, or modify the image.

SUMMARY

The present invention provides an improved mechanism for sending images. According to an exemplary embodiment of the invention, if an image is captured with an image-capturing mechanism while a device functioning cooperatively with the image-capturing mechanism is engaged in a voice call with a given party and a determination is made that the image was captured during a predefined time-interval prior to establishing the voice call with the given party, the device will responsively send the image to the given party.

In one respect, the exemplary embodiment could take the form of a system that includes (i) an image-capturing mechanism for capturing an image; (ii) a communication interface for engaging in a voice call with a given party, (iii) a processor, and (iv) program instructions executable by the processor. The exemplary program instructions are executable (i) to determine that the image was captured during a predefined time-interval prior to engaging in the voice call with the given party, and (ii) to responsively send the image to the given party. The image-capturing mechanism could take the form of an image sensor, such as an image sensor found in a digital camera.

In another respect, the exemplary embodiment could take the form of an apparatus that includes (i) a digital camera segment for capturing an image, (ii) a wireless phone segment for establishing a voice call with a given party, (iii) a processor, and (iv) program instructions executable by the processor (a) for determining that the image was captured during a predefined interval prior to establishing the voice call, and (b) for responsively sending the image to the given party.

In another respect, the exemplary embodiment could take the form of a camera phone that includes: (i) a telephone keypad, (ii) a display, (iii) a wireless communication interface, (iv) data storage, (v) a processor, (vi) a speaker, (vii) a lens, (viii) a shutter-release button, (ix) an image-capture program for storing digital representations of images in the data storage, and (x) an image-send program for sending an image to a given party in response to a determination that the camera phone captures the image during a predefined time-interval prior to establishing a voice call with the given party.

In yet another respect, the exemplary embodiment could take the form of an apparatus that includes (i) means for engaging in a voice call with a given party, (ii) means for capturing an image during a predefined time-interval prior to the voice call, (iii) means for detecting capture of the image during the predefined time-interval, and (iv) means for sending the image to the given party in response to detecting capture of the image during the predefined time-interval. Sending the image could involve the means for engaging in the voice call transmitting the image to a network (i) during the voice call, (ii) while the voice call is ending, or (iii) after the voice call has ended.

In still yet another respect, the exemplary embodiment could take the form of a method that includes the functions of: (i) capturing an image at a camera phone, (ii) establishing a voice call between the camera phone and a given party, (iii) determining that the image was captured during a predefined time-interval prior to establishing the voice call, and (iv) responsively sending the image to the given party.

These as well as other aspects and advantages of the invention will become apparent to those of ordinary skill in the art by reading the following detailed description, with reference where appropriate to the accompanying drawings. Further, it should be understood that the embodiments described in this summary and elsewhere are intended to be examples only and do not necessarily limit the scope of the invention as claimed.

BRIEF DESCRIPTION OF DRAWINGS

Exemplary embodiments of the present invention are described herein with reference to the drawings, in which.

DETAILED DESCRIPTION

1. Overview

The present invention provides an improved mechanism for sending a digital image. An exemplary embodiment of the present invention in the form of a system includes (i) an image-capturing mechanism for capturing an image, (ii) a communication interface for engaging in a voice call with a given party, (iii) a processor, and (iv) data storage for storing program instructions executable by the processor. Execution of the exemplary program instructions provides (i) for detecting that the image-capturing mechanism captures a digital image during a predefined time-interval prior to the communication interface engaging in a voice call with the given party, and (ii) for responsively sending the digital image to the given party.

Figure 1:
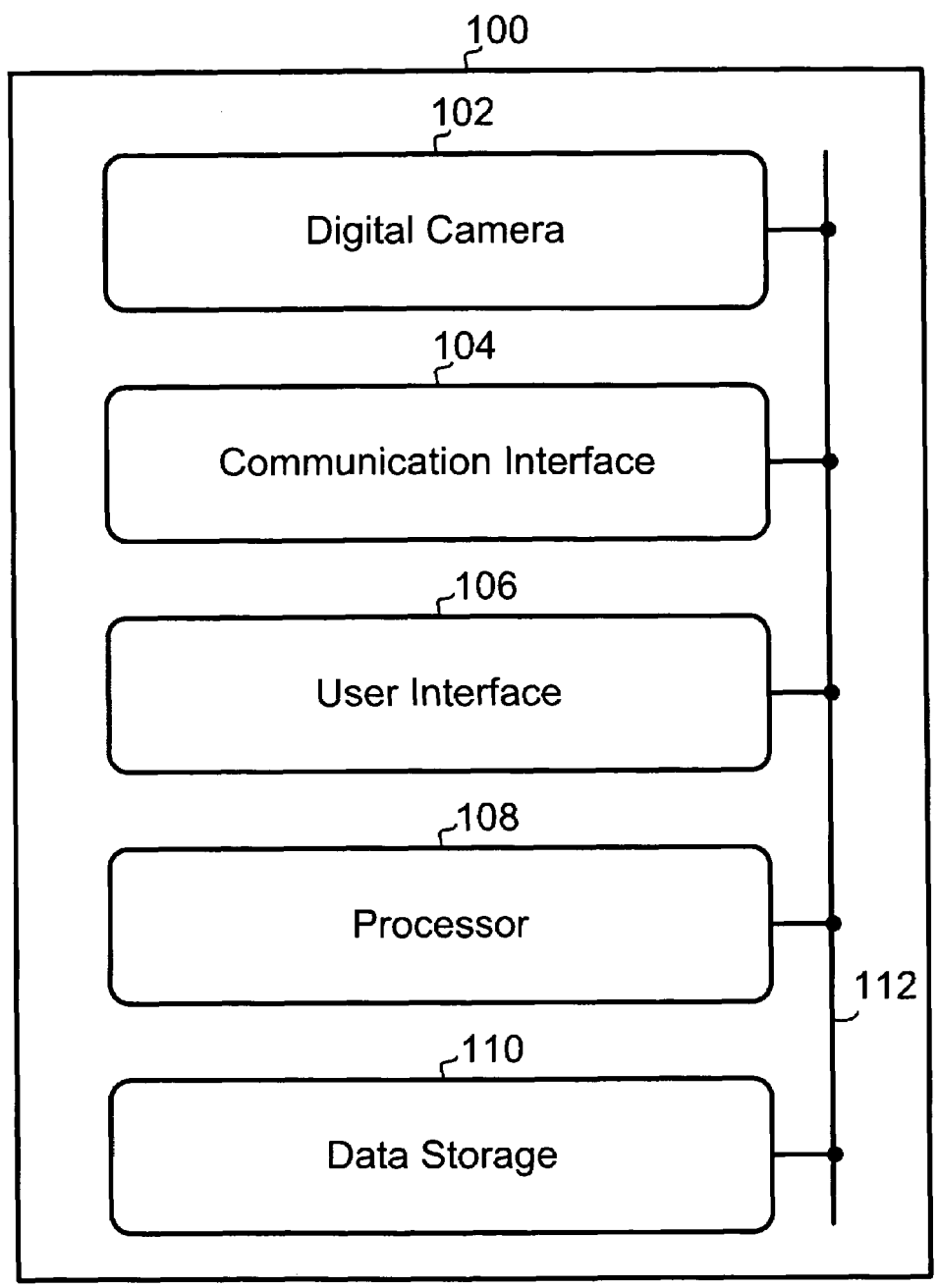
FIG. 1 is a simplified block diagram depicting functional components of an exemplary system.

In one respect, the exemplary embodiment could comprise a system 100 as shown in FIG. 1. The system 100 includes a digital camera 102, a communication interface 104, a user interface 106, a processor 108, and data storage 110, all linked together via a system bus, network, or other connection mechanism 112. The system 100 could be arranged as an integrated apparatus, such as a camera phone that includes the digital camera 102, the communication interface 104, the user interface 106, the processor 108, the data storage 110, and the connection mechanism 112. Alternatively, the system 100 could be arranged by connecting one or more separate components. For example, a system comprising a separate digital camera connected to a separate communication interface, such as a cellular phone that includes a user interface, a processor, and data storage. Other exemplary arrangements of the system 100 are also possible.

The digital camera 102 comprises means for capturing digital images at the system 100. The digital camera 102 may include components and features typically found in a digital camera. For instance, a digital camera that includes: (i) a lens for focusing light from a subject being photographed, (ii) a light source for illuminating the subject, (iii) an image-capturing mechanism for (a) detecting light from the subject, (b) converting the light from the subject to an array of electrical charges, and (c) storing an array of digital values representing the array of electrical charges.

An exemplary image-capturing mechanism in the digital camera 102 that detects, converts, and stores comprises an image sensor having light sensitive diodes that convert light from a subject into electrical charges. Commonly used images sensors include charge coupled device (CCD) image sensors and complementary metal oxide semiconductor (CMOS) image sensors. The image-capturing mechanism may include optical filtering for providing color images. As an alternative to using an image sensor in the digital camera 102, the digital camera 102 could comprise an optical scanner device or some other means suitable for capturing digital images.

The communication interface 104 provides means for establishing and engaging in voice calls with a given party and for transmitting images. An exemplary given party comprises a device, remote from the system 100, for engaging in voice calls with the system 100 and/or for receiving a digital image sent from the system 100. The exemplary given party could also comprise a user of the device. Examples of the device include a remote camera phone, a remote Voice over Internet Protocol (VoIP) telephone, and a remote landline telephone. Other examples of the device remote from system 100 are also possible.

The communication interface 104 could comprise a wired-telephone-interface that includes a network interface card (NIC) for interfacing with a wired packet-data network. The NIC could be coupled to a wired packet-data network and/or could be a wireless NIC that communicates with the wired packet-data network via an air interface. An exemplary air interface for a wireless NIC is the IEEE 802.11 air interface standards established by the Institute of Electrical and Electronics Engineers (IEEE), Inc. The NIC controls flow of data between the communication interface 104 and streams of data on the wired packet-data network. Alternatively, the wired-telephone-interface could comprise a modem for interfacing with a conventional land-line telephone system.

The communication interface 104 could comprise a wireless-telephone-interface. A wireless-telephone-interface interfaces with a wireless network, such as a radio access network (RAN), via an established air interface protocol. A RAN may be terrestrial, such as a cellular communication network, or celestial, such as a satellite communication network. An exemplary air interface protocol for interfacing with a RAN is the Code Division Multiple Access (CDMA) protocol. Other air interface protocols, such as Time Division Multiple Access (TDMA), Advanced Mobile Phone System/Service (AMPS), and Global System for Mobile Communications (GSM), could be used as well. A wireless-telephone-interface could include a chipset and an antenna for interfacing with a RAN. An exemplary chipset that facilitates air interface communication according to the CDMA protocol is the MSM6000™ chipset manufactured by Qualcomm Incorporated of San Diego, Calif.

The user interface 106 comprises a variety of components for performing a variety of functions. For example, the user interface 106 comprises (i) a telephone keypad for dialing phone numbers, (ii) a display for indicating a variety of information, such as a phone number, (iii) a microphone for receiving sounds, such as words spoken by a user of the system 100, and (iv) a speaker for playing sounds, such as words spoken by a called party and telephone sounds, such as a ring tone indicating an incoming phone call. Other examples of user interface components and features are also possible.

The processor 108 could comprise one or more processors, such as a general purpose processor and/or a digital signal processor. The processor 108 executes program instructions stored at the data storage 110 in order to work cooperatively with the digital camera 102, the communication interface 104, the user interface 106, and the data storage 110. For example, the processor 108 executes one or more program instructions (i) to cause the digital camera 102 to capture a digital image via as an image-capturing mechanism and to store the digital image at data storage 110, and (ii) to cause the communication interface 104 to send the digital image to a given party.

The data storage 110 preferably stores a set of program instructions executable by the processor 108 to carry out various functions described herein. In addition to the program instructions, the data storage 110 stores other types of data, such as digital images, telephone numbers, and destination-identifiers.

The data storage 110 comprises a computer readable medium, such as a magnetic disc, an optical disc, organic memory, and/or any other volatile or non-volatile mass storage system readable by the processor 108. Alternatively, the data storage 110 comprises a combination of one or more segments of computer readable media. For example, data storage 110 comprising a first segment of data storage located in the processor 108 and a second segment of data storage remote from the processor 108, such as at the digital camera 102. Other examples of data storage segments are also possible.

2. Exemplary Architecture

FIGS. 1, 2, 3 and 4 illustrate various arrangements for carrying out the present invention. It should be understood, however, that these and other arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether. Further, many of the elements described herein are functional entities that may be implemented as discrete or distributed components or in conjunction with other components, in any suitable combination and location.

a. Network Architecture

Figure 2:
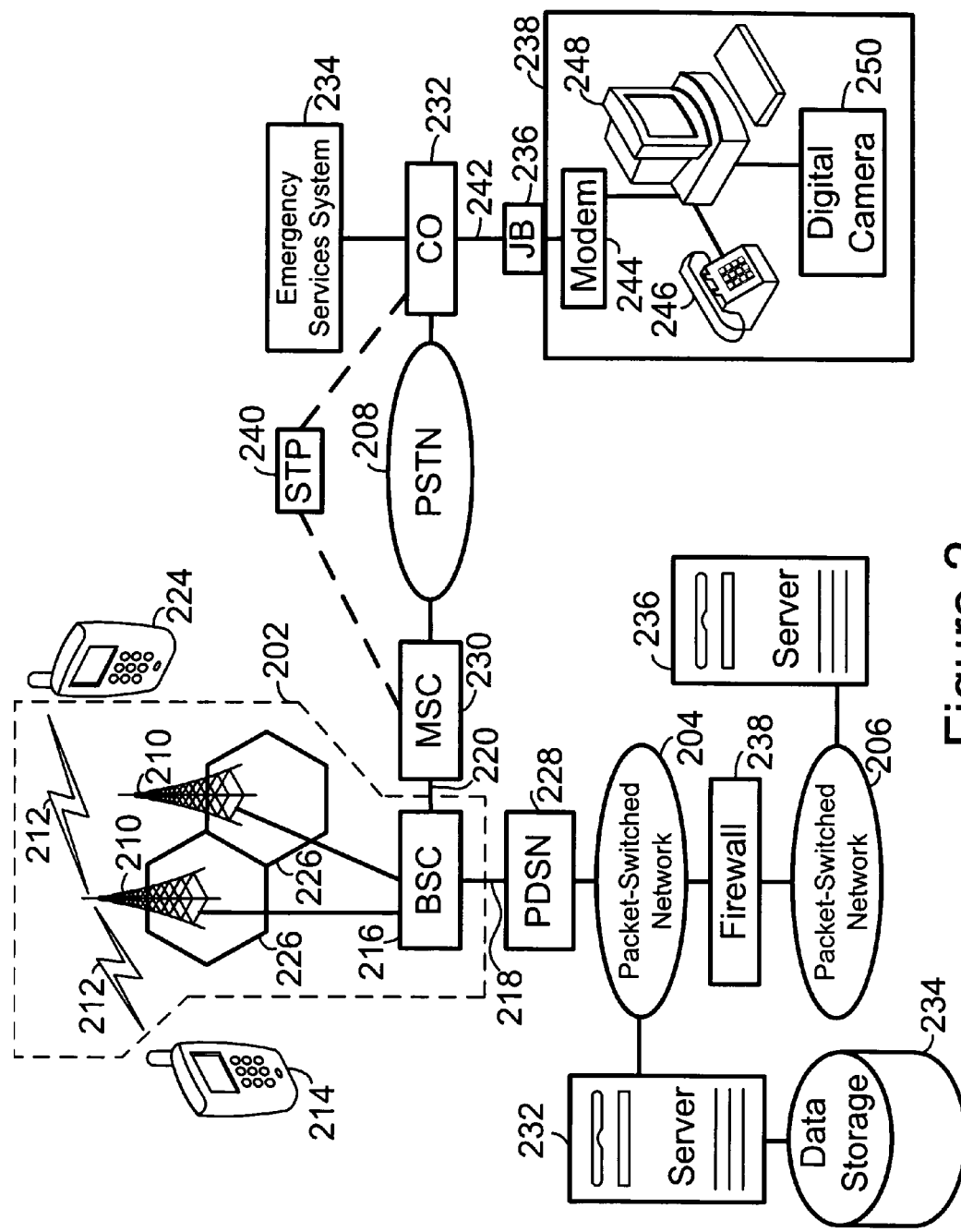
FIG. 2 is a block diagram illustrating a system in which an exemplary embodiment can be implemented.

FIG. 2 depicts various networks and network components for use with an exemplary embodiment of the present invention. In particular, FIG. 2 shows a RAN 202, a first packet-switched network 204, a second packet-switched network 206, and a public switched telephone network (PSTN) 208. The second packet-switched network 206 could be the Internet.

The RAN 202 comprises a base station 210, a radio frequency (RF) air interface 212 operating between a first camera phone 214 and the base station 210, a base station controller (BSC) 216, and first and second coupling mechanisms 218, 220. The RF air interface 212 also operates between a second camera phone 224 and the base station 210. The RF air interface 212 could operate according to the CDMA air interface protocol or some other air interface protocol. Each base station 210 forms a corresponding cell 226 by radiating signals away from the base station 210. The radiated signals are arranged according to an air interface protocol. Each base station 210 may comprise an antenna for radiating signals and a tower for mounting the antenna at an elevation above the ground.

The BSC 216 performs many functions. For example, the BSC 216 manages the use of each base station 210 coupled to the BSC 216. The BSC 216 also controls the handoff of a wireless device, such as the first camera phone 214, from one base station to another base station as the wireless device moves from one cell to another cell. The BSC 216 provides connection interface to the first coupling mechanism 218 which connects to a packet-data serving node (PDSN) 228 and provides connection interface to the second coupling mechanism 220 which connects to a mobile switching center (MSC) 230.

The PDSN 228 is a gateway between the BSC 216 and the first packet-switched network 204. An exemplary first packet-switched network 204 is a wireless carrier's data core network. A data core network provides packet-data communication services to wireless devices, such as the first and second camera phones 214, 224. The PDSN 228 facilitates establishing, maintaining, and terminating point-to-point protocol (PPP) links for the first and second camera phones 214, 224.

The first and second camera phones 214, 224 can each establish a PPP link with the PDSN 228. For example, the first camera phone 214 and the PDSN 228 negotiates the establishment of a first PPP link between the first camera phone 214 and the PDSN 228 via the RAN 202. The PDSN 228 assigns an IP address to the first camera phone 214 for directing data to the first camera phone 214. After establishment of the first PPP link, the first camera phone 214 communicates with entities, such as the first network server 232 via the first packet-switched network 204. An example of the first camera phone 214 communicating with the first network server 232 is the first camera phone 214 sending an image to the first network server 232. Other examples of PPP links, such as a second PPP link between the PDSN 228 and the second camera phone 224 are also possible. Further, other examples of the first camera phone 214 communicating with the first network server 232 are also possible.

A firewall 238 coupled to the first and second packet-switched networks 204, 206 acts as a gateway for communications between the first and second packet-switched networks 204, 206. The firewall 238 could perform network address translation (NAT) functions to allow communication between the first packet-switched network 204 and the second packet-switched network 206. Returning back to the example of the first PPP link between the first camera phone 214 and the PDSN 228, the firewall is arranged to allow a user of the first camera phone 214 to communicate beyond the firewall 238 to the second packet-switched network 206. In this regard, a user of the first camera phone 214 could then communicate with a network entity, such as the second network server 238, via the second packet-switched network 206. Other examples of the first wireless phone 214 communicating beyond the firewall 238 are also possible.

Another network shown in FIG. 2 is the PSTN 208 which comprises one or more trunk lines operating as communication paths between various switches. Exemplary switches include the MSC 230 and a switch at a central office (CO) 232. The MSC 230 couples the RAN 202 to one or more trunk lines of the PSTN 208.

The CO 232 is a facility operated by a local exchange carrier for interconnecting telephone lines. Exemplary telephone lines interconnected at the CO 232 include local-loop telephone lines, the one or more trunk lines of the PSTN 208, and dedicated trunk lines. A dedicated trunk line is a telephone circuit used for a single purpose, such as the transmission of an emergency telephone call to an emergency services system 234. An example of an emergency services system 234 is a public safety answering point (PSAP) which responds to requests for emergency service during an emergency telephone call by dispatching emergency responders, such as police officers and fire fighters, to assist the caller.

The MSC 230 and the CO 232 work cooperatively with a signaling transfer point (STP) 240 to determine when to connect the MSC 230 and the switch at the CO 232 to a trunk line of the PSTN 208. The cooperative relationship between the MSC 230, the CO 232, and the STP 240 facilitates setting up and tearing down telephone calls via the PSTN 208.

A junction box 236 is coupled to the CO 232 via a local loop telephone line 242. The junction box 236 is coupled to a variety of customer premises equipment (CPE). Examples of CPE include a modem 244, a landline telephone 246, and a computer 248 which is coupled to a digital camera 250. Other examples of CPE are also possible. The CPE coupled to the local loop telephone line 242 operates under a telephone number assigned to the local loop telephone line 242.

b. Camera Phone Architecture

Figure 3:
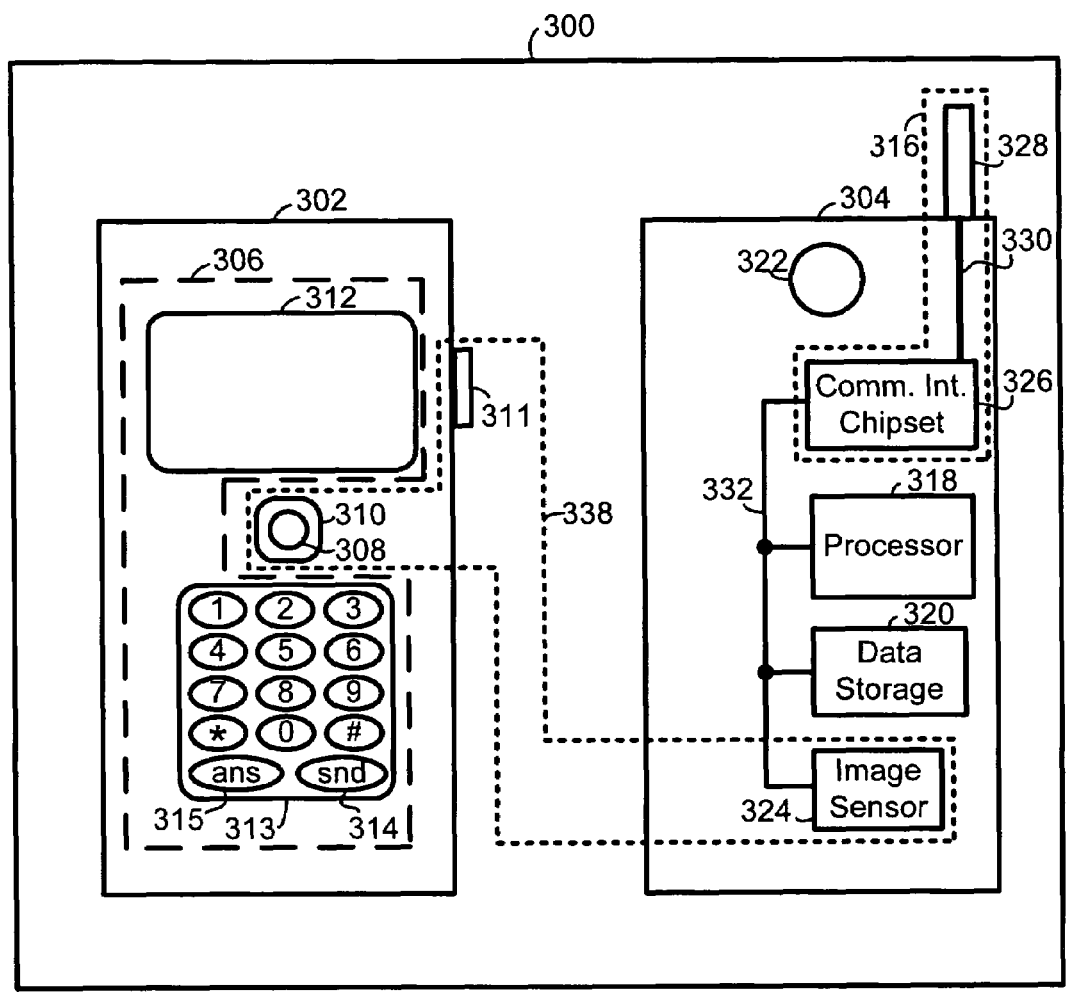
FIG. 3 is a diagram of an exemplary camera phone.

FIG. 3 illustrates an architecture of an exemplary camera phone 300 that includes a first camera phone section 302 and a second camera phone section 304. The first and second camera phone sections 302, 304 could be coupled together in any of a variety of ways to form the camera phone 300. The system 100 shown in FIG. 1 and the first and second camera phones 214, 224 shown in FIG. 2 could each be arranged as the camera phone 300.

The first camera phone section 302 includes a user interface 306, a camera lens 308, a shutter 310, and a shutter-release button 311. The user interface 306 comprises a display 312 and a telephone keypad 313. The user interface 306 could include other components as well. The telephone keypad 313 comprises a set of keys for entering a phone number of a given party, a send key 314 for sending a call-origination message to a base station, and an answer key 315 for answering an incoming voice call to the camera phone 300. Alternatively, the telephone keypad 313 could comprise a send/answer key for performing the functions of sending a call-origination message and answering an incoming voice call. A call-origination message is a message that comprises a phone number of a given party and a service request to place a call to the given party. Other examples of keys on the telephone keypad 313 for performing camera phone functions are also possible.

The second camera phone section 304 includes a communication interface 316, a processor (i.e., one or more processors) 318, data storage 320, a speaker 322, and an image sensor 324. The processor 318 could be arranged as the processor 108 shown in FIG. 1 and the communication interface 316 could be arranged as the communication interface 104 shown in FIG. 1.

The communication interface 316 comprises a communication interface chipset 326, an antenna 328, and a coupling mechanism 330 that couples the communication interface chipset 326 to the antenna 328. The communication interface chipset 326 operates according to one or more RF air interface protocols. The antenna provides a mechanism for communicating with a base station, such as the base station 210 shown in FIG. 2. The processor 318, the data storage 320, the image sensor 324, and the communication interface chipset 326 are all be linked together via a system bus, network, or other connection mechanism 332.

A digital camera segment 338 of the camera phone 300 includes the camera lens 308, the shutter 310, the shutter-release button 311, and the image sensor 324. A user of the camera phone 300 triggers capturing a digital image by engaging the shutter-release button 311. Engaging the shutter-release button 311 opens the shutter 310 to allow light indicative of an image to pass through the camera lens 308 for detection and capture by the image sensor 324.

The display (i.e., one or more displays) 312 could comprise one of a variety liquid crystal displays, such as a thin-film transistor LCD, a super twisted nematic LCD, or a thin-film diode LCD. Other exemplary display types are also possible. The display 312 shows a variety of data, such as a captured image or digits of a phone number selected by pressing keys on the telephone keypad 313.

The speaker 322 produces a variety of sounds for a user of the camera phone 300. For example, the speaker 322 produces voice sounds from a given party at a remote telephone and telephone-function sounds, such as a ring tone, a busy tone, and a call-waiting tone. The speaker 322 could also produce additional sounds, such as a camera shutter sound in response to engagement of the shutter-release button 311 so that a user and non-users of the camera phone 300 are aware that an image is being captured.

The data storage 320 could be arranged as data storage 110 shown in FIG. 1. The data storage 320 stores a variety of data, such as digital images, phone numbers, destination-identifiers, and program instructions executable by the processor 318. The phone numbers in data storage 320 are arranged as a phone book available to a user of the camera phone 300. A phone book could store other data in addition to phone numbers, such as a name and/or an e-mail address associated with a phone number. Other examples of data stored in data storage 320 are also possible.

The exemplary program instructions stored in data storage 320 comprise instructions executable by processor 318 to perform a variety of functions. For example, program instructions arranged as an image-capture program for detecting engagement of the shutter-release button 311 and for responsively opening the shutter 310 to allow light to pass to the image sensor 324 for capture of a digital image. As another example, program instructions arranged as an image-send program for sending an image to a given party. A destination-identifier could be sent along with the digital image. The exemplary image-send program includes instructions for sending an image in response to the image being captured during a predefined time-interval prior to the camera phone 300 establishing a voice call. The processor 318 works cooperatively with the communication interface 316 to send the image to the given party.

The program instructions stored in data storage 320 could also comprise instructions for determining a destination-identifier that indicates a destination for a digital image to be sent to a given party. An exemplary destination-identifier comprises a phone number or an e-mail address for a given party engaging in a voice call with the camera phone 300 that captures a digital image during the a predefined time-interval prior to the voice call. The instructions for determining the destination-identifier may direct the processor to use as the destination-identifier the phone number to the which the camera phone placed the current voice call. Alternatively, the instructions could direct the processor to derive a destination-identifier based on such a phone number or other related information, such as through a lookup in a local phone book for instance. The program instructions could take other forms as well.

c. Data Storage Architecture

Processor 318 uses data stored in data storage for a variety of functions. For example, the processor using data such as an e-mail address or a telephone number stored in a phone book portion of data storage as a basis to generate a destination-identifier. Another example, the processor storing (i) a time when an image is captured, and (ii) a time when a voice call is established, for determining whether the image was captured during a predefined interval prior to the time of establishing the voice call. Yet another example, the processor retrieving a captured digital image from the data storage for transmission to a given party. Other examples are possible as well.

Figure 4:
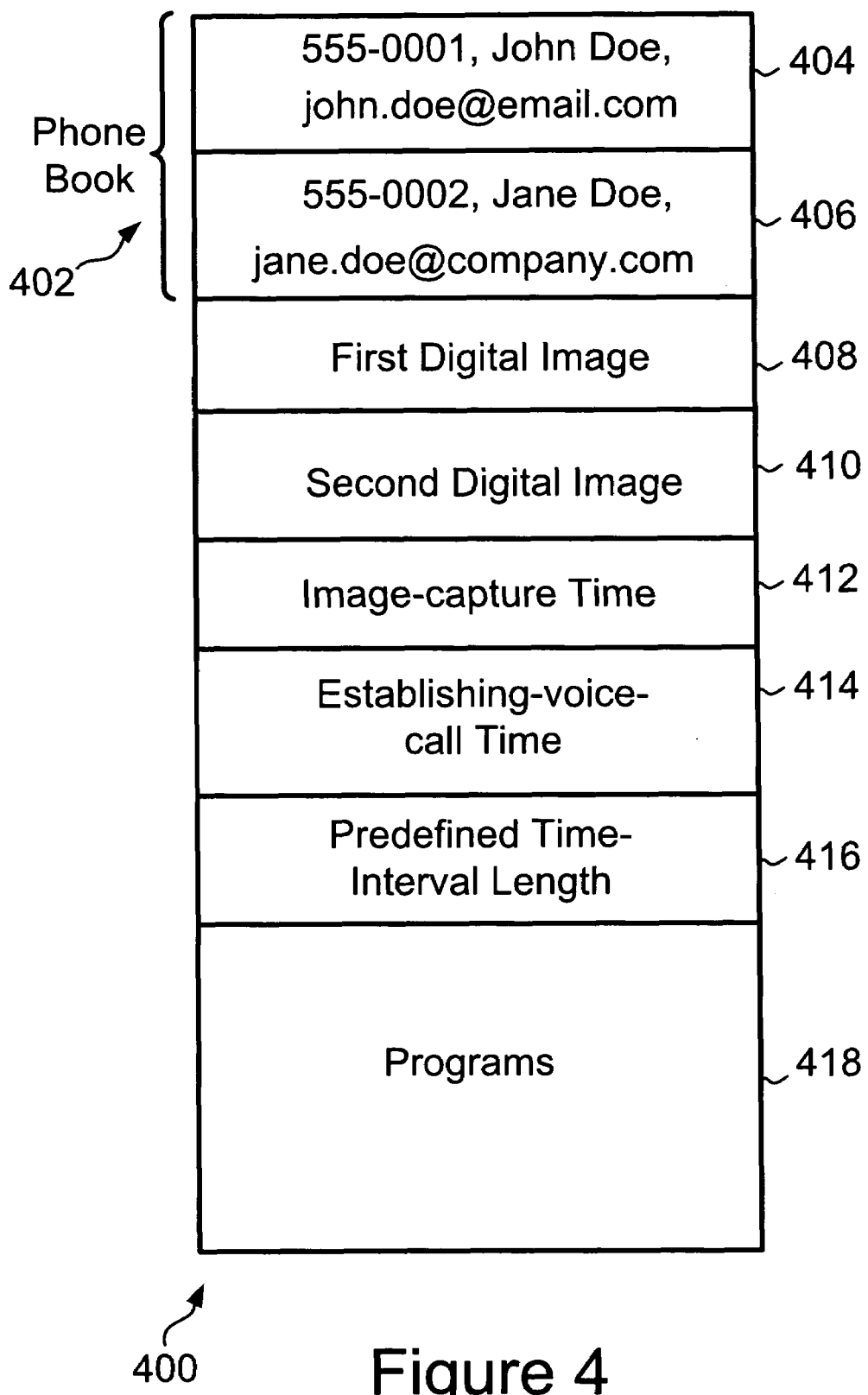
FIG. 4 is an illustration of exemplary data stored in data storage within a camera phone.

The data stored in data storage could be arranged in various ways. FIG. 4 depicts an exemplary arrangement of data storage 400. Data storage 400 includes a plurality of data blocks for storing various types of data, such as digital images, phone numbers, destination-identifiers, and programs executable by a processor. Other exemplary arrangements of the data are also possible.

By way of example, the data storage 400 holds local phone book data 402 that correlates names, phone numbers, e-mail addresses and other information. For instance, the local phone book date includes (i) a first data block 404 comprising a first phone number "555-0001", a first name "John Doe", and a first e-mail address "john.doe@email.com", and (ii) a second data block 406 comprising a second phone number "555-0002", a second name "Jane Doe", and a second e-mail address "jane.doe@company.com." The local phone book data 402 could include other data blocks as well.

The data storage 400 holds digital images, such as a first digital image 408 and a second digital image 410. These digital images can be images captured by the camera phone prior to a voice call, during a voice call, or after the voice call has ended.

Further, the data storage 400 also holds (i) an image-capture time 412 that is the time when a digital image, such as the second digital image 410, is captured by the camera phone, (ii) an establishing-voice-call time 414 that is the time when a voice call is established, and (iii) a predefined time-interval length 416 which represents an amount of time which could be used to determine a predefined time-interval that occurs prior to the establishing-voice-call time 414. For example, if the predefined time-interval length is 30 seconds and if the establishing-voice-call time 414 is one o'clock (1:00:00) AM, then a predefined time-interval is from twelve fifty-nine and 30 seconds (12:59:30) AM to one o'clock (1:00:00) AM. Other examples of a predefined time-interval length and predefined time-intervals are also possible.

Still further, the data storage 400 holds program instructions 418 executable by processor, such as processor 108 shown in FIG. 1 or processor 318 shown in FIG. 3. As noted above, example programs that can be stored include an image-capture program and an image-send program. Another example, program instructions comprising timer-logic for use in determining the image-capture time 412 and the establishing-voice-call time 414 could be stored as program instructions 418. Other examples are also possible.

3. Exemplary Operation

According to the exemplary embodiment, processor 318 executes an image-capture program to store an image in data storage 400 and the communication interface 316 establishes a voice call with a given party. After establishing the voice call with the given party, the processor 318 executes an image-capture-time program to determine if the image was captured during a predefined time-interval prior to establishment of the voice call. If the image was captured during the predefined time-interval, the processor 318 responsively executes an image-send program for sending the image to the given party (e.g., to a destination associated with the given party).

For instance, assume a user of camera phone 300 captures an image and the processor 318 responsively stores the image as the first digital image 408. Assume next that the user operates the camera phone 300 to place a voice call to John Doe at phone number 555-0001, at some point in time after capture of the image. In accordance with the exemplary embodiment, processor 318 would further programmatically detect that the image was captured during a predefined time-interval prior to the voice call with phone number 555-0001 and may responsively reference local phone book data to obtain a corresponding e-mail address (e.g. John Doe's e-mail address). Processor 318 may then automatically send a message or stream of data that carries the image and the e-mail address. In turn, John Doe can conveniently receive the image delivered to the e-mail address.

Figure 5:
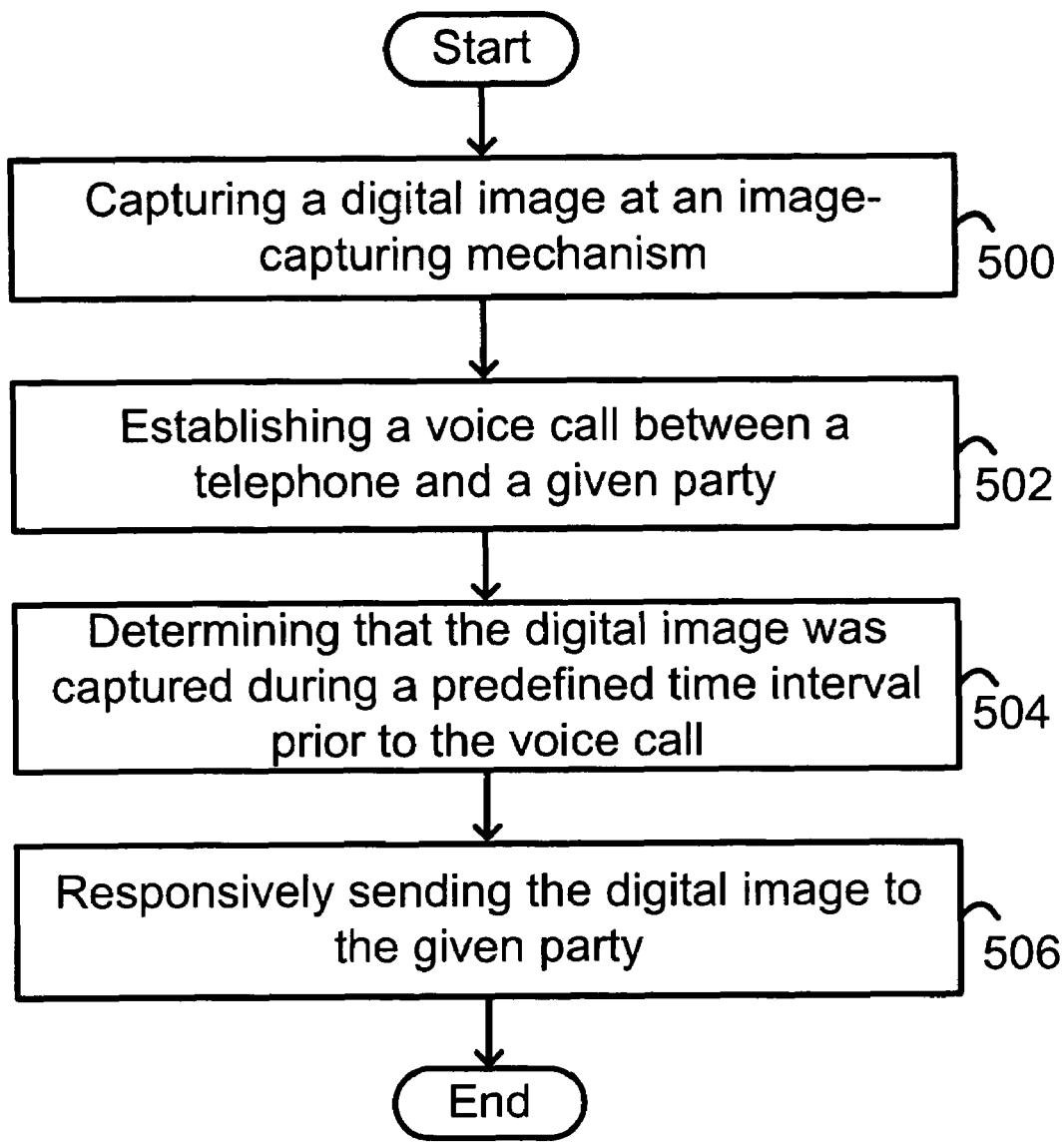
FIG. 5 is a flow chart depicting functions that can be carried out in accordance with an exemplary embodiment.

FIG. 5 is a flow chart provided to illustrate some of these functions. As shown in FIG. 5, at step 500, an image-capturing mechanism function captures a digital image. The image-capturing mechanism could be integrated with a telephone, as in a camera phone for instance. Alternatively, the image-capturing mechanism could be separate from and communicatively coupled with a telephone. For example, an image-capturing mechanism coupled with a computer that is coupled with a telephone, so that the telephone can receive (capture) a digital image.

Referring to FIG. 3, the act of capturing the digital image during a predefined time-interval prior to the voice call involves a user engaging the shutter-release button 311 to open the shutter 310, so as to allow light from a subject to pass through the lens 308 for detection of the light at the image sensor 324. Further, the act of capturing the digital image involves the processor 318 executing an image-capture program as described above, to store the captured image in data storage 400.

The captured image could be an image of various subjects. For instance, an image of a user of the camera phone, an image of a sporting event, or an image of an emergency scene. Other examples are also possible.

Next, step 502, a voice call is established between a telephone and a given party. Various types of telephones are available for engaging in the voice call. For example, a telephone such as the first camera phone 214 shown in FIG. 2, the landline telephone 246 shown in FIG. 2, or a VoIP telephone. Other types of telephones are also available for engaging in a voice call with the given party.

The act of establishing a voice call with a given party could involve dialing digits of a telephone number of a given party and telephone network components switching circuits to connect a call. By way of example, a camera phone receives from a user a set of dialed digits defining a number to call and the camera phone responsively sends a call origination message, carrying those dialed digits, to base station 210. MSC 230 then responsively sets up and connects the call for the camera phone. As another example, a landline telephone sends dual tone multiple frequency (DTMF) tones representing dialed digits to a central office switch and the switch operates to connect the landline telephone to a circuit connected to a telephone of the given party for connecting a call with the given party. Examples of the given party include a user of a remote telephone, such as the first camera phone 214, the second camera phone 224, or a telephone at an emergency services system 234.

Next, step 504, in response to establishing the voice call between the telephone and the given party, a predetermined time-interval is identified and a determination is made whether a digital image was captured during the predefined time-interval. The length of a predetermined time-interval could be a default value for voice calls to some given parties or could be a non-default value for voice calls to some other given parties. For example, the predefined time-interval could be a default value, such as 30 seconds, for any voice calls to a given party that does not have a non-default value associated with it. Alternatively, if a given party, such as the emergency services system 234, has a non-default value (e.g. 2 minutes) associated with it, then the processor 318 would use the non-default value to determine the predetermined time-interval. Non-default values for time-intervals could be stored in a local phone book, such as the phone book 402. Other examples of determining the predetermined time-interval are also possible.

After determining, the predetermined time-interval, the processor 318 refers to data storage to determine if an image was captured during the predefined time-interval prior to establishment of the voice call. If more than one image was captured during the predefined time-interval, program logic for selecting an image for transmission to a given party could be arranged to select the last image captured during the predefined time-interval, all of the images captured during the predetermined time-interval, or some other quantity or order of images captured during predetermined time-interval.

Figure 6:
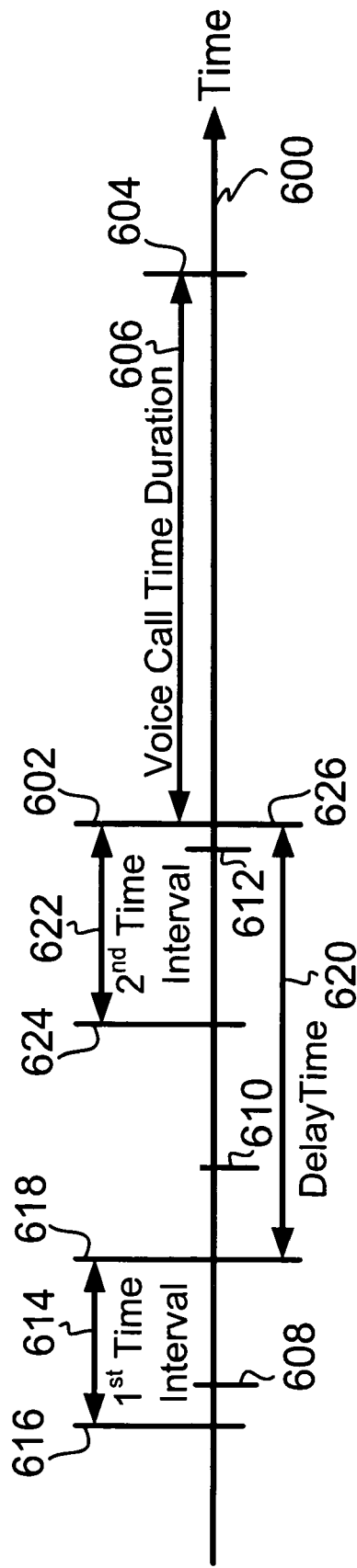
FIG. 6 is a diagram depicting the timing of events for operating an exemplary embodiment.

FIG. 6 is a timing diagram that illustrates timing of exemplary functions associated with (i) capturing an image during a predefined time-interval prior to a voice call, and (ii) making the determination that the image was captured during the predefined time-interval. A time-line 600 illustrates a passage of time relative to the occurrence of the exemplary functions occurring at times represented by lines perpendicular to the time-line 600.

An establishing-voice-call time 602 is a time when a telephone establishes a voice call with a given party. Various functions associated with establishing a voice call could be used to trigger storing the establishing-voice-call time 602. For example, with the camera phone 300 operating according to the CDMA protocol, the establishing-voice-call time could occur (i) when the camera phone sends a call-origination message to a RAN, (ii) receives a traffic channel assignment from a base station, or (iii) detects voice conversation on a traffic channel. A traffic channel is a communication path, for signaling traffic (e.g. a call origination message) and user traffic (e.g. voice communication) between the camera phone 300 and a base station. Other examples of functions or ways to trigger storage of an establishing-voice-call time are also possible.

A voice-call-end time 604 is a time when the voice call ends. The time duration between the establishing-voice-call time 602 and the voice-call-end time 604 is the voice call time duration 606. Various functions associated with ending a voice call could be used to trigger storing the voice-call-end time 604. For example, a caller hanging up a telephone to end a voice call triggers storage of the voice-call-end time 604. Other examples of functions or ways to trigger storage of a voice-call-end time are also possible. Using the exemplary embodiment, a digital image could be sent to the given party (i) prior to the voice-call-end time 604, (ii) after the voice-call-end time 604, or (iii) at the voice-call-end time 604.

The capture of a digital image could occur at various times in relation to establishment of a voice call. For example, a digital image could be captured (i) prior to establishing a voice call, (ii) while establishing a voice call, or (iii) after establishing a voice call. FIG. 6 depicts three exemplary image-capture times, a first image-capture time 608, a second image-capture time 610 and a third image-capture time 612, that all occur prior to establishing a voice call at the establishing-voice-call time 602. An image-capture time, such as the first, second, or third image capture times 608, 610, 612 is stored as the image-capture time 412 in data storage 400. For example, the processor 318 executes an image-capture-time program to store an image-capture time as the image-capture time 412. In this regard, the image-capture-time program uses an event, such as engagement of the shutter-release button 311, to trigger storage of the image-capture time 412. An image-capture time could be a time-stamp associated with an image, where the time-stamp is the time when that the image was captured. The time-stamp could be stored along with the digital image or store separate from the digital image. Other examples of events or ways to trigger storage of an image-capture time are also possible.

After establishment of a voice call at the establishing-voice-call time 602, the exemplary embodiment determines whether an image captured was captured during a predefined time-interval prior to the establishing-voice-call time 602. A predefined time-interval can include (i) an interval-start-time, and (ii) an interval-end-time. The interval-end-time in a predefined time-interval could coincide with the establishing-voice-call time 602 or could occur prior to the establishing-voice-call time 602 offset by a delay time. For example, a first time-interval 614 spans from a first time-interval-start time 616 to a first time-interval-end time 618. The first time-interval-end time 618 occurs prior to the establishing-voice-call time 602 offset by the delay time 620. Another example, a second time-interval 622 spans from a second time-interval-start time 624 to a second time-interval-end time 626. In this example, the second time-interval-end time 626 coincides with the establishing-voice-call time 602 offset by a delay time of zero (0) seconds.

The delay-time 620 spans from the first time-interval-end time 618 to the establishing-voice-call time 602. The delay-time 626 could be an amount of time, such as 30 seconds or some other amount of time greater than or less than 30 seconds. If the delay time 620 is decreased to zero seconds, the first time-interval-end time 618 will coincide with the establishing-voice-call time 602. The delay-time 620 could be stored in a data block of data storage, such as data storage 400.

In making the determination that the digital image was captured during a predefined time-interval prior to a voice call, a processor could execute program instructions to compare a predefined time-interval to an image-capture time. For example, if the camera phone 300 is arranged to determine if an image is captured during the first time-interval 614, after establishment of the voice call at the establishing-voice-call time 602, the processor 318 compares the first, second, and third image-capture times 608, 610, 612 to the first time-interval 614 to determine that the first image-capture time 608 occurs during the first time-interval 614. The processor 318 could also execute program instruction to determine that the second and third image-capture times did not occur during the first time-interval 614. Other examples of determining that a digital image was captured during a predefined time-interval prior to a voice call are also possible.

Returning back to FIG. 5, after determination that a digital image was captured during a predefined time-interval prior to a voice call, step 506 involves responsively sending the digital image (or more than one digital image, such as a video sequence) to the given party. Sending the digital image to the given party involves the processor 318 executing program instructions, such as instructions to control the communication interface 316 and the data storage 320. Execution of the exemplary program instructions involves formatting the digital image in data-packets in preparation for transmitting the image through a RAN and a packet-data network.

Sending the digital image to the given party involves the communication interface 316 establishing a PPP link with the PDSN 228 and then sending the digital image to a network entity, such as the first network server 232, via the RAN 202 and the first packet-switched network 202. The communication interface 316 could also send a destination-identifier along with the digital image to the network entity. A destination-identifier is used by the network entity as a basis to route the digital image to the given party. For example, the first network server 232 receives a digital image and a destination-identifier and then use the destination-identifier to route the digital image to a given party, such as the second camera phone 224, via one or more networks, such as the first packet-switched network 204 and the RAN 202. Other examples of the digital image being routed to a given party are also possible.

4. CONCLUSION

Exemplary embodiments of the present invention have been described above. Those skilled in the art will understand, however, that changes and modifications may be made to the embodiments described without departing from the true scope and spirit of the present invention, which is defined by the claims.

I claim:

1. A method comprising:
    storing a delay time value at data storage of a camera phone;
    capturing an image at the camera phone;
    establishing a voice call between the camera phone and a given party;
    determining a start time of the voice call;
    using the start time of the voice call and an interval-length value as a basis to determine that the image was captured during a particular time interval occurring prior to the start time of the voice call,
    wherein the particular time interval spans a time duration indicated by the interval-length value and ends before the start time of the voice call, and
    wherein the delay time value indicates an amount of time between an end time of the particular time interval and the start time of the voice call; and
    in response to determining the image was captured during the particular time interval, sending the image to the given party.

2. The method of claim 1, wherein determining that the image was captured during the particular time-interval comprises:
    comparing an image-capture time to the particular time-interval,
    wherein the image-capture-time occurs when capturing the image at the camera phone.

3. The method of claim 1, wherein sending the image to the given party comprises sending the image through a network.

4. The method of claim 3, further comprising:
    sending a destination-identifier, along with the image, through the network, wherein an entity in the network uses the destination-identifier as a basis to route the image to the given party.

5. The method of claim 4, wherein the destination-identifier is a phone number of the given party.

6. The method of claim 1, wherein sending the image to the given party comprises sending the image through a radio access network and a packet-data network.

7. The method of claim 6, further comprising:
    formatting the image in data-packets for sending the image through the radio access network and the packet-data network.

8. The method of claim 1, wherein the given party comprises a user device, and
    wherein sending the image to the given party comprises sending the image to the user device.

9. The method of claim 1, further comprising:
    storing the interval length value at the data storage of the camera phone.

10. The method of claim 1,
    wherein establishing the voice call includes dialing a telephone number of the given party, and
    wherein sending the image to the given party includes sending the image to a destination indicated by an e-mail address of the given party.

11. The method of claim 10, further comprising:
    deriving the e-mail address from the telephone number of the given party.

12. A method comprising:
    storing a delay time value at data storage of a camera phone;
    capturing at least one image at the camera phone;
    establishing a voice call between the camera phone and a given party;
    determining a start time of the voice call;
    using the start time of the voice call and an interval-length value as a basis to determine that the at least one image was captured during a particular time interval occurring prior to the start time of the voice call,
    wherein the particular time interval spans a time duration indicated by the interval-length value and ends before the start time of the voice call, and
    wherein the delay time value indicates an amount of time between an end time of the particular time interval and the start time of the voice call; and
    in response to determining the at least one image was captured during the particular time interval, sending the at least one image to the given party.

13. The method of claim 12, wherein the at least one image comprises a video sequence.

14. A method comprising:
    storing a delay time value at data storage of a camera phone;
    capturing an image at the camera phone;
    establishing a voice call between the camera phone and a destination;
    determining a start time of the voice call;
    using the start time of the voice call and an interval-length value as a basis to determine that the image was captured during a particular time interval occurring prior to the start time of the voice call,
    wherein the particular time interval spans a time duration indicated by the interval-length value and ends before the start time of the voice call, and
    wherein the delay time value indicates an amount of time between an end time of the particular time interval and the start time of the voice call; and
    in response to determining the image was captured during the particular time interval, sending the image to the destination.

15. A camera phone comprising:
    data storage to store a delay time value;
    a digital camera segment for capturing an image;
    a wireless phone segment for establishing a voice call with a given party;
    a processor; and
    program instructions executable by the processor to (i) determine a start time of the voice call, (ii) use the start time of the voice call and an interval-length value as a basis to determine that the image was captured during a particular time-interval that occurred prior to the start time of the voice call, wherein the particular time interval spans a time duration indicated by the interval-length value and ends before the start time of the voice call, and wherein the delay time value indicates an amount of time between an end time of the particular time interval and the start time of the voice call, and (iii) in response to determining that the image was captured during the particular time-interval, cause the wireless phone segment to send the image to a network for transmission, in turn, to the given party.

16. The camera phone of claim 15, further comprising:
    timer-logic for providing the processor with an image-capture time and the start time of the voice call,
    wherein the processor uses the image capture time and the start time of the voice call to determine that the image was captured during the particular time-interval.

17. The camera phone of claim 16,
wherein the data storage contains the image, the image-capture time, the start time of the voice call, the interval-length value, and the program instructions.

18. The camera phone of claim 15, wherein the program instructions further comprise:
instructions for determining a destination-identifier associated with the given party; and
instructions for sending the destination-identifier along with the image to the network for use by a network entity to transmit the image to the given party.

19. The camera phone of claim 18, wherein the destination-identifier comprises an e-mail address of the given party.

20. The camera phone of claim 15,
wherein the data storage contains the interval-length value.

21. The camera phone of claim 20, wherein the given party is a public safety answering point (PSAP).

22. The camera phone of claim 20, wherein the interval-length value is a default value.

23. The camera phone of claim 20, wherein the interval-length value is a non-default value.

24. A camera phone comprising:
means for storing a delay time value at the camera phone;
means for establishing a voice call with a given party;
means for capturing an image during a particular time-interval, wherein the particular time interval occurs prior to establishment of the voice call;
means for determining a start time of the voice call;
means for using the start time of the voice call and an interval-length value as a basis to determine that the image was captured during the particular time-interval, wherein the particular time interval spans a time duration indicated by the interval-length value and ends before the start time of the voice call, and wherein the delay time value indicates an amount of time between an end time of the particular time interval and the start time of the voice call; and
means for sending the image to the given party in response to determining the image was captured during the particular time-interval.

25. The camera phone of claim 24,
wherein the means to store the delay time value further stores the captured image, the start time of the voice call, and the interval-length value.

26. A camera phone comprising:
a telephone keypad;
a display;
a wireless communication interface for establishing a voice call with a given party;
data storage to store a delay time value;
a processor;
a speaker for playing sounds;
a lens for receiving light indicative of images;
a shutter-release button engagable by a user to trigger capture of images;
a first program stored in the data storage and executable by the processor to cause the data storage to store the captured images;
a second program stored in the data storage and executable by the processor to determine a start time of the voice call; and
a third program stored in the data storage and executable by the processor to (i) use the start time of the voice call and an interval-length value as a basis to determine that the data storage currently contains an image captured during a particular time-interval that occurred prior to the start time of the voice call, wherein the particular time interval spans a time duration indicated by the interval-length value and ends before the start time of the voice call, and wherein the delay time value indicates an amount of time between an end time of the particular time interval and the start time of the voice call, and (ii) cause the wireless communication interface to send the image to the given party in response to the determination that the data storage currently contains the image captured during the particular time interval.

27. The camera phone of 26,
wherein the data storage further stores the interval-length value used by the third program to determine that the data storage contains the image captured during the particular time interval that occurred prior to the start time of the voice call.

28. A system comprising:
data storage to store a delay time value and an interval-length value;
an image-capturing mechanism for capturing an image;
a communication interface for establishing a voice call with a given party;
a processor; and
program instructions executable by the processor to (i) determine a start time of the voice call, (ii) use the start time of the voice call and the interval-length value as a basis to determine that the image was captured during a particular time-interval that occurred prior to the start time of the voice call, wherein the particular time interval spans a time duration indicated by the interval-length value and ends before the start time of the voice call, and wherein the delay time value indicates an amount of time between an end time of the particular time interval and the start time of the voice call, and (iii) in response to determining that the image was captured during the particular time interval, cause the communication interface to send the image to the given party.

* * * * *